United States Patent
Zhang et al.

(10) Patent No.: US 7,944,715 B2
(45) Date of Patent: May 17, 2011

(54) CONTROLLER FOR USE IN A RESONANT DIRECT CURRENT/DIRECT CURRENT CONVERTER

(75) Inventors: Qingyou Zhang, Taipei (TW); Xiaoyi Jin, Taipei (TW); Yuli Feng, Taipei (TW); Zhihong Ye, Taipei (TW); Qinglin Zhao, Taipei (TW)

(73) Assignee: Lite-On Technology Corp., Taipei (TW)

( * ) Notice: Subject to any disclaimer, the term of this patent is extended or adjusted under 35 U.S.C. 154(b) by 501 days.

(21) Appl. No.: 12/213,708

(22) Filed: Jun. 24, 2008

(65) Prior Publication Data

US 2009/0196080 A1 Aug. 6, 2009

(30) Foreign Application Priority Data

Jan. 31, 2008 (TW) ................................ 97103735 A

(51) Int. Cl.
*H02M 3/335* (2006.01)

(52) U.S. Cl. .................... 363/21.02; 363/21.11; 363/41; 363/97

(58) Field of Classification Search ............... 363/21.02, 363/21.09, 21.1, 21.11, 21.17, 21.18, 41, 363/97

See application file for complete search history.

(56) References Cited

U.S. PATENT DOCUMENTS

| | | | | |
|---|---|---|---|---|
| 5,687,067 A * | 11/1997 | Majid et al. | ...................... | 363/97 |
| 6,304,473 B1 * | 10/2001 | Telefus et al. | ................... | 363/97 |
| 6,882,552 B2 * | 4/2005 | Telefus et al. | ................... | 363/97 |
| 7,012,819 B2 * | 3/2006 | Feldtkeller | ................. | 363/21.01 |
| 2008/0084723 A1 * | 4/2008 | Balakrishnan et al. | ......... | 363/97 |
| 2009/0034298 A1 * | 2/2009 | Liu et al. | ........................ | 363/17 |

* cited by examiner

*Primary Examiner* — Jeffrey L Sterrett
(74) *Attorney, Agent, or Firm* — Rosenberg, Klein & Lee

(57) ABSTRACT

A controller is adapted for controlling a switch of a resonant direct current/direct current converter, and includes: a pulse width modulation controlling unit for detecting an output voltage of the resonant direct current/direct current converter, and for generating a pulse width modulation signal according to the output voltage detected thereby; a fixed frequency signal generating unit for generating a fixed frequency signal; and a logic synthesizing unit for synthesizing the pulse width modulation signal and the fixed frequency signal so as to generate a driving signal that is adapted to drive the switch of the resonant direct current/direct current converter.

8 Claims, 3 Drawing Sheets

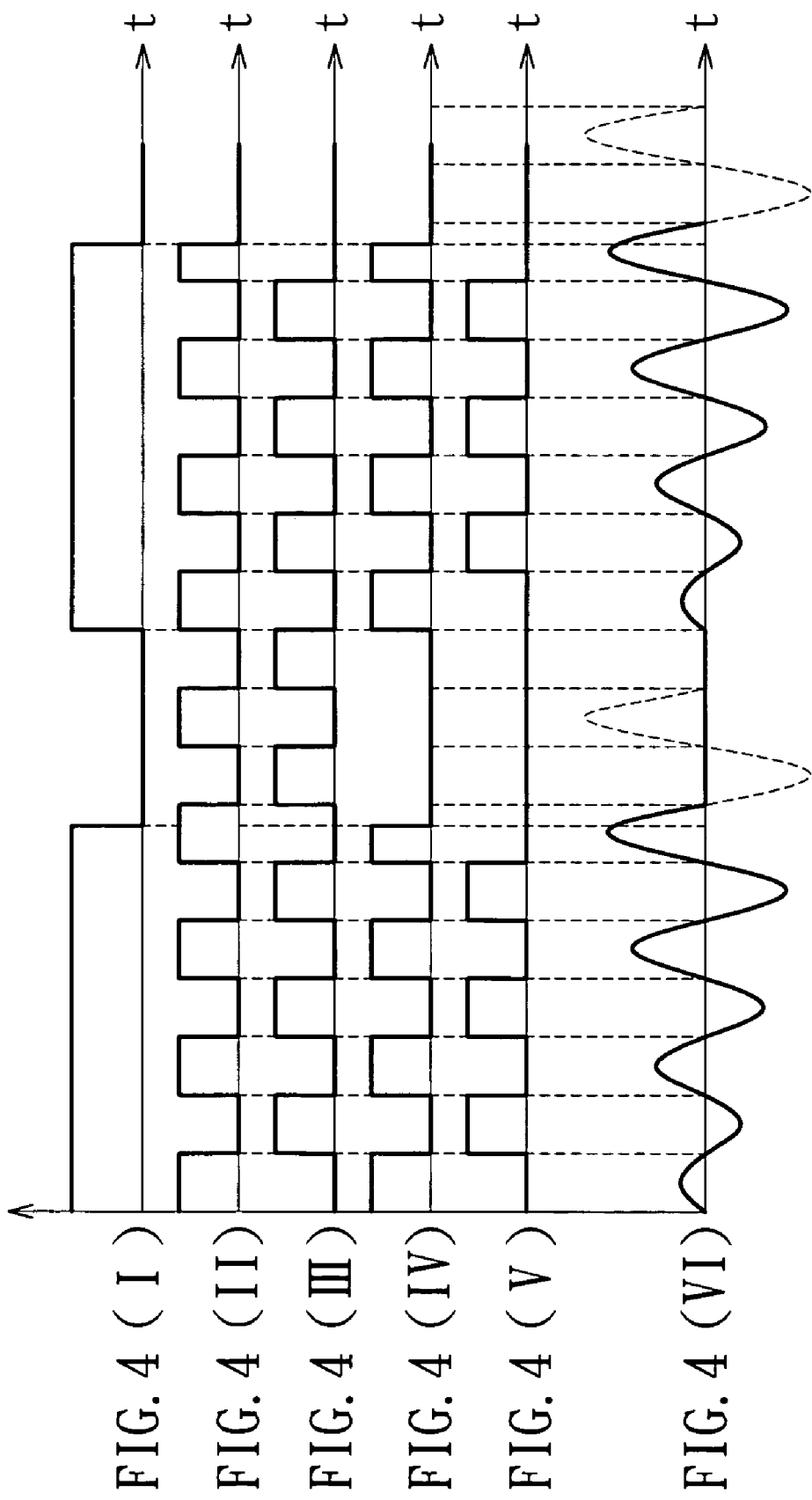

CONTROLLER FOR USE IN A RESONANT DIRECT CURRENT/DIRECT CURRENT CONVERTER

CROSS-REFERENCE TO RELATED APPLICATION

This application claims priority of Taiwanese Application No. 097103735, filed on Jan. 31, 2008.

BACKGROUND OF THE INVENTION

1. Field of the Invention

The invention relates to a controller, more particularly to a controller for use in a resonant direct current/direct current converter.

2. Description of the Related Art

As shown in FIG. 1, a half bridge LLC resonant direct current converter 11 is conventionally controlled by a frequency modulation controller 12, which detects an output voltage of the half bridge LLC resonant direct current converter 11 and varies frequency of a switching control signal when the operating condition is varying, so as to maintain the output voltage at the required level. The half bridge LLC resonant direct current converter 11 includes two switches (not shown), and the switching control signal includes first and second driving signals (as shown in FIG. 2).

However, since the frequency of the switching control signal varies according to the output voltage, the converter 11 has a range of variation of the switching control signal, making it easy to deviate from an optimal operating point, and in turn resulting in a large design margin in order to overcome uncertainty caused by the variation. Furthermore, the variable frequency characteristic inherent to the half bridge LLC resonant direct current converter 11 also increases the complexity of control.

SUMMARY OF THE INVENTION

Therefore, the objective of the present invention is to provide a controller that is adapted for use in a resonant direct current/direct current converter so that the resonant direct current/direct current converter operates in an optimal operating frequency, that is, resonant frequency, under different output loading or input conditions.

According to the present invention, there is provided a controller adapted for use in a resonant direct current/direct current converter for controlling a switch of the resonant direct current/direct current converter. The controller includes a pulse width modulation controlling unit, a fixed frequency signal generating unit, and a logic synthesizing unit.

The pulse width modulation controlling unit is adapted to be coupled electrically to the resonant direct current/direct current converter for detecting an output voltage of the resonant direct current/direct current converter, and for generating a pulse width modulation signal according to the output voltage detected thereby.

The fixed frequency signal generating unit is coupled electrically to the pulse-width modulation controlling unit for generating a fixed frequency signal.

The logic synthesizing unit is coupled electrically to the pulse width modulation controlling unit and the fixed frequency signal generating unit for synthesizing the pulse width modulation signal and the fixed frequency signal so as to generate a driving signal that is adapted to drive the switch of the resonant direct current/direct current converter.

BRIEF DESCRIPTION OF THE DRAWINGS

Other features and advantages of the present invention will become apparent in the following detailed description of the preferred embodiment with reference to the accompanying drawings, of which:

FIG. 4(I) to FIG. 4(VI) are waveform diagrams respectively illustrating a plurality of signals relevant to operation of the preferred embodiment.

DETAILED DESCRIPTION OF THE PREFERRED EMBODIMENT

Figure 1:
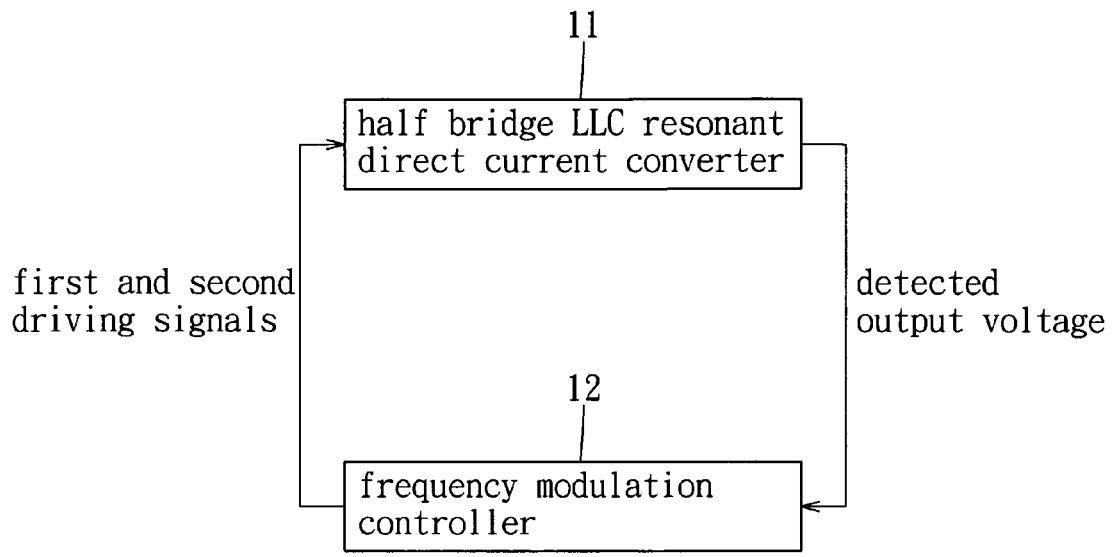
FIG. 1 is a schematic block diagram, illustrating a half bridge LLC resonant direct current converter controlled by a frequency modulation controller in the prior art.
Figure 2:
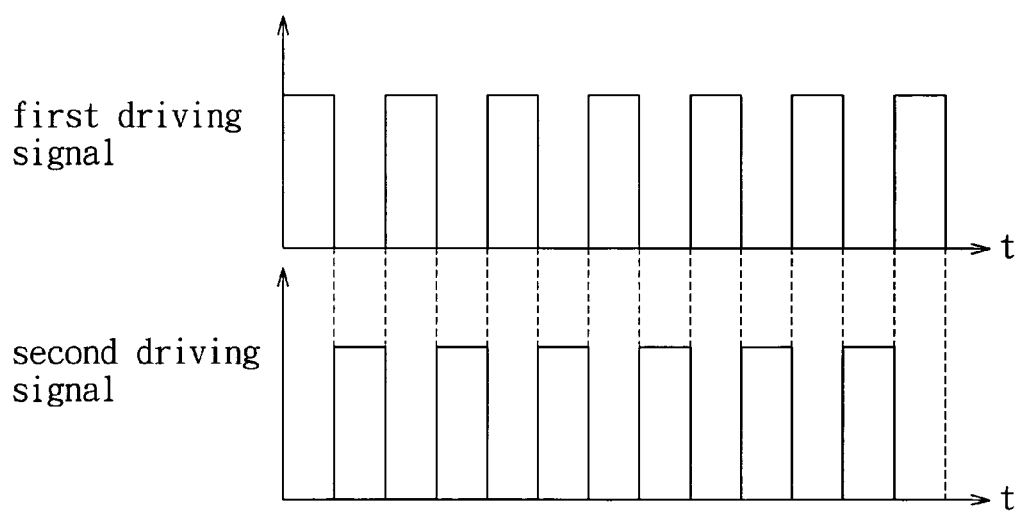
FIG. 2 is a waveform diagram, illustrating a switching control signal in the prior art.
Figure 3:
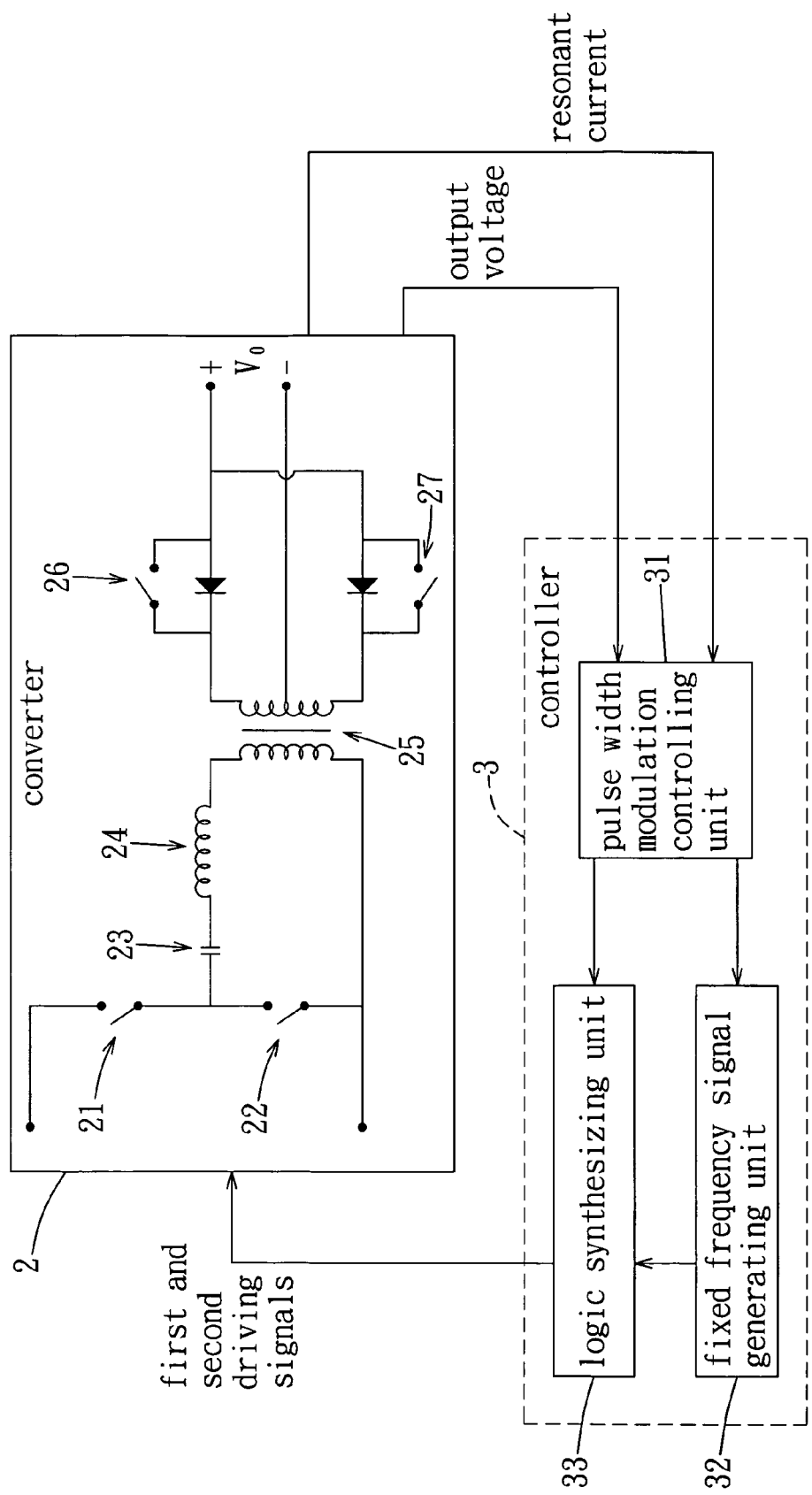
FIG. 3 is a schematic diagram of the preferred embodiment of a controller according to the present invention adapted to be connected to a resonant direct current/direct current converter.

With reference to FIG. 3, the preferred embodiment of a controller 3 according to the present invention is adapted for use in a resonant direct current/direct current converter 2. The controller 3 is adapted to control a switch of the resonant direct current/direct current converter 2 such that an output voltage (Vo) of the resonant direct current/direct current converter 2 conforms to the requirements. In this embodiment, the resonant direct current/direct current converter 2 is a symmetrical half bridge LLC resonant direct current/direct current converter, and includes first and second switches 21, 22. Therefore, the controller 3 is adapted to control both the first and second switches 21, 22 of the resonant direct current/direct current converter 2. The resonant direct current/direct current converter 2 further includes a capacitor 23, a resonant inductor 24, a transformer 25 and two synchronous rectifiers 26, 27. The synchronous rectifiers 26, 27 are coupled electrically to a secondary coil of the transformer 25. Since the resonant direct current/direct current converter 2 is well known in the art, further details of the same are omitted herein for the sake of brevity. It should be noted herein that the controller 3 of the present invention is also applicable for use in other types of resonant direct current/direct current converters, such as asymmetrical LLC, full bridge LLC, symmetrical half bridge LC, asymmetrical LC, and full bridge LC resonant direct current/direct current converters.

The controller 3 includes a pulse width modulation controlling unit 31, a fixed frequency signal generating unit 32, and a logic synthesizing unit 33.

The pulse width modulation controlling unit 31 is adapted to be coupled electrically to the resonant direct current/direct current converter 2 for detecting the output voltage (Vo) of the resonant direct current/direct current converter 2, and for generating a pulse width modulation signal according to the output voltage (Vo) detected thereby. An exemplary waveform of the pulse width modulation signal is illustrated in FIG. 4(I).

The fixed frequency signal generating unit 32 is coupled electrically to the pulse-width modulation controlling unit 31 for generating a fixed frequency signal, an exemplary waveform of which is illustrated in FIG. 4(II). In this embodiment, the fixed frequency signal generating unit 32 receives the pulse width modulation signal from the pulse width modulation controlling unit 31, and uses the pulse width modulation signal as a synchronization signal for generating the fixed frequency signal. In particular, the fixed frequency signal generating unit 32 uses a rising edge of the pulse width modulation signal as the synchronization signal for generating the fixed frequency signal.

The logic synthesizing unit 33 is coupled electrically to the pulse width modulation controlling unit 31 and the fixed frequency signal generating unit 32 for synthesizing the pulse width modulation signal and the fixed frequency signal so as to generate a driving signal that is adapted to drive the first and second switches of the resonant direct current/direct current converter 2.

In the following description, the fixed frequency signal generated by the fixed frequency signal generating unit 32 is referred to as a first fixed frequency signal. The logic synthesizing unit 33 generates a second fixed frequency signal as illustrated in FIG. 4(III) from the first fixed frequency signal. The second fixed frequency signal has a frequency that is equal to that of the first fixed frequency signal, and a phase that is inverse to that of the first fixed frequency signal. In this embodiment, the logic synthesizing unit 33 performs multiplication synthesis on the pulse width modulation signal and the first fixed frequency signal so as to generate the driving signal, which is referred to as a first driving signal as illustrated in FIG. 4(IV), for driving the first switch 21 of the resonant direct current/direct current converter 2. The logic synthesizing unit 33 further performs multiplication synthesis on the pulse width modulation signal and the second fixed frequency signal so as to generate a second driving signal as illustrated in FIG. 4(V) for driving the second switch 22 of the resonant direct current/direct current converter 2.

The pulse width modulation signal has a duty cycle that varies inversely with a voltage level of the output voltage (Vo) of the resonant direct current/direct current converter 2 detected by the pulse width modulation controlling unit 31. It should be noted herein that the pulse width modulation signal has a fixed period. Therefore, when the pulse width modulation controlling unit 31 detects that the voltage level of the output voltage (Vo) of the resonant direct current/direct current converter 2 is too small, the pulse width modulation controlling unit 31 increases the duty cycle of the pulse width modulation signal such that, since the pulse width modulation signal has a fixed period, a time duration of a low signal level of the pulse width modulation signal is accordingly reduced. Consequently, a time duration of the first and second switches 21, 22 being turned on is increased to thereby increase the output voltage (Vo) of the resonant direct current/direct current converter 2. On the other hand, when the pulse width modulation controlling unit 31 detects that the voltage level of the output voltage (Vo) of the resonant direct current/direct current converter 2 is too large, the pulse width modulation controlling unit 31 decreases the duty cycle of the pulse width modulation signal such that, since the pulse width modulation signal has a fixed period, the time duration of the low signal level of the pulse width modulation signal is accordingly increased. Consequently, the time duration of the first and second switches 21, 22 being turned on is decreased to thereby decrease the output voltage (Vo) of the resonant direct current/direct current converter 2. As a result, the output voltage (Vo) of the resonant direct current/direct current converter 2 is maintained at a steady level.

It is known from the above that the pulse width modulation controlling unit 31 controls the duty cycle of the pulse width modulation signal merely based on the output voltage (Vo) of the resonant direct current/direct current converter 2. More preferably, the pulse width modulation controlling unit 31 is adapted to further detect a resonant current of the resonant direct current/direct current converter 2, and generates the pulse width modulation signal according to the output voltage (Vo) and the resonant current detected thereby. An exemplary waveform of the resonant current is illustrated in FIG. 4(VI). For example, modulation errors between the resonant current and the output voltage (Vo) may be compared to form a double loop control for controlling the duty cycle of the pulse width modulation signal.

It should be noted herein that the pulse width modulation signal has a frequency smaller than that of the fixed frequency signal. In particular, the frequency of the pulse width modulation signal is not greater than one tenth of that of the fixed frequency signal. In addition, the first and second driving signals are not only adapted for driving the first and second switches 21, 22 of the resonant direct current/direct current converter 2, but may also be adapted for driving the synchronous rectifiers 26, 27.

Moreover, since the preferred embodiment combines the first and second fixed frequency signals and the pulse width modulation signal for generating the first and second driving signals so as to achieve the control of the resonant direct current/direct current converter 2, operation of the resonant direct current/direct current converter 2 in the optimal operating point (i.e., having a substantially fixed resonating frequency) under all loading conditions can be ensured. Furthermore, by utilizing the first and second driving signals to control the first and second switches 21, 22 of the resonant direct current/direct current converter 2, an optimal design for magnetic components, such as the resonant inductor 24 and the transformer 25, in the resonant direct current/direct current converter 2 can be more easily achieved.

In addition, since the rising edge of the pulse width modulation signal is used by the fixed frequency signal generating unit 32 as the synchronization signal for generating the first fixed frequency signal in this embodiment, it can be ensured that a pulse width of a cycle for the first fixed frequency signal is consistently at the high signal level in each duty cycle of the pulse width modulation signal, thereby ensuring a consistent activating state for the resonating current as illustrated in FIG. 4(VI). Although the rising edge of the pulse width modulation signal is used as the synchronization signal for generating the first fixed frequency signal in the preferred embodiment, a falling edge of the pulse width modulation signal may also be used as the synchronization signal for generating the first fixed frequency signal in other embodiments of the present invention. Thus, the present invention is not limited to this aspect.

In sum, the controller 3 according to the present invention is relatively simple in structure, where control of the switches 21, 22 of the resonant direct current/direct current converter 2 is achieved by using the fixed frequency signal and the pulse width modulation signal, such that the resonant direct current/direct current converter 2 is ensured to operate at the optimal operating point under all loading conditions. Aside from having a simple structure, the controller 3 also reduces the number of switching of the switches 21, 22 of the resonant direct current/direct current converter 2, thereby reducing stress of the switches 21, 22. Consequently, the object of the present invention is achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A controller adapted for use in a resonant direct current/direct current converter for controlling a switch of the resonant direct current/direct current converter, said controller comprising:
   a pulse width modulation controlling unit adapted to be coupled electrically to the resonant direct current/direct current converter for detecting an output voltage of the resonant direct current/direct current converter, and for generating a pulse width modulation signal according to the output voltage detected thereby;
   a fixed frequency signal generating unit coupled electrically to said pulse-width modulation controlling unit for generating a fixed frequency signal; and
   a logic synthesizing unit coupled electrically to said pulse width modulation controlling unit and said fixed frequency signal generating unit for synthesizing the pulse width modulation signal and the fixed frequency signal so as to generate a driving signal that is adapted to drive the switch of the resonant direct current/direct current converter.

2. The controller as claimed in claim 1, wherein said fixed frequency signal generating unit receives the pulse width modulation signal from said pulse width modulation controlling unit, and uses the pulse width modulation signal as a synchronization signal for generating the fixed frequency signal.

3. The controller as claimed in claim 2, wherein said fixed frequency signal generating unit uses a rising edge of the pulse width modulation signal as the synchronization signal for generating the fixed frequency signal.

4. The controller as claimed in claim 1, wherein said pulse width modulation controlling unit is adapted to further detect a resonant current of the resonant direct current/direct current converter, and generates the pulse width modulation signal according to the output voltage and the resonant current detected thereby.

5. The controller as claimed in claim 4, wherein the pulse width modulation signal has a frequency smaller than that of the fixed frequency signal.

6. The controller as claimed in claim 5, wherein the frequency of the pulse width modulation signal is not greater than one tenth of that of the fixed frequency signal.

7. The controller as claimed in claim 1, wherein said logic synthesizing unit performs multiplication synthesis on the pulse width modulation signal and the fixed frequency signal so as to generate the driving signal.

8. The controller as claimed in claim 1, wherein the pulse width modulation signal has a duty cycle that varies inversely with a voltage level of the output voltage of the resonant direct current/direct current converter detected by said pulse width modulation controlling unit.

* * * * *